United States Patent

Murch

[11] 3,934,066
[45] Jan. 20, 1976

[54] FIRE-RESISTANT INTUMESCENT LAMINATES

[75] Inventor: Robert Matthews Murch, Ashton, Md.

[73] Assignee: W. R. Grace & Co., New York, N.Y.

[22] Filed: July 18, 1973

[21] Appl. No.: 380,386

[52] U.S. Cl. ............... 428/248; 156/309; 428/249; 428/276; 428/278; 428/315; 428/321; 428/921
[51] Int. Cl.² .......................................... B32B 3/26
[58] Field of Search ............... 117/137, 136, 138; 161/403, 161; 428/920, 921, 248, 249, 278, 276; 156/309

[56] References Cited
UNITED STATES PATENTS

| | | | |
|---|---|---|---|
| 2,813,046 | 11/1957 | Lauring | 161/403 UX |
| 2,912,392 | 11/1959 | Stilbert, Jr. et al. | 117/137 |
| 3,202,567 | 8/1965 | Muri et al. | 161/403 |
| 3,320,087 | 5/1967 | Erickson | 161/403 |
| 3,466,222 | 9/1969 | Curtis | 161/403 |
| 3,672,951 | 6/1972 | Moore et al. | 161/161 |
| 3,733,289 | 5/1973 | Burns et al. | 117/137 |

FOREIGN PATENTS OR APPLICATIONS 1,084,503   9/1967   United Kingdom ............... 161/403

Primary Examiner—William J. Van Balen
Attorney, Agent, or Firm—Giedre M. McCandless

[57] ABSTRACT

A fire-retardant, intumescent laminate system suitable for application to combustible or heat-sensitive substrates comprises an intumescent layer which is a porous sheet material, e.g., paper or foams saturated with an intumescent composition and having a flexible protective layer adhered to the intumescent layer. The intumescent laminate system may include a vapor barrier layer, e.g., aluminum foil and/or a thermal barrier layer, e.g., glass wool or cardboard adjacent to the intumescent layer, and is particularly suitable as a protective, fireretardant overlay on thermally delicate substrates such as organic foams, e.g., polystyrene.

21 Claims, 6 Drawing Figures

U.S. Patent   Jan. 20, 1976   3,934,066

FIRE-RESISTANT INTUMESCENT LAMINATES

BACKGROUND OF THE INVENTION

This invention relates to fire-retardant intumescent laminate systems suitable for application to combustible or heat-sensitive substrates to protect such substrate from fire and heat. More particularly this invention relates to flexible, intumescent laminate systems useful as a protective overlay for a variety of combustible or heat-deformable substrates such as wood, plywood, fiber board or organic foams.

It is well known that intumescent coatings are useful fire-retardant coatings for protection of combustible, as well as heat-sensitive, substrates. The characteristic feature of all intumescent coatings in that the intumescent composition, upon exposure to heat or flame, swells or puffs up to a relatively thick cellular foam char which possesses heat-insulative and fire-retardant properties. The heat or flame activated reaction causes the intumescent materials to foam and expand into thick cellular foam char and generate inert gases such as nitrogen, carbon dioxide, etc., which are entrapped in the foam and thus prevent the access of air and oxygen to the combustible substrate. This swelled cellular, generally carbonaceous, char layer which adheres to the substrate expands to many times the thickness of the original coating and thus effectively insulates the substrate from heat and serves as an effective oxygen barrier.

Prior art intumescent coatings have been applied as films, i.e., paints or mastic coatings, directly to the surface to be protected in liquid form by brushing, rolling or spraying. Generally, pretreatment of this surface is necessary prior to application of the intumescent coatings, and several coatings are usually required in order to achieve the necessary fire-retardant protection. Similarly, it is difficult to obtain uniform coatings. These procedures are time consuming and expensive. Furthermore, inexpensive and simple intumescent formulations cannot be used in paints because they are soluble in water. Since these intumescent coatings are usually subjected to frequent washing and high humidity conditions, the water soluble components are leached out and the coating loses most of its fire-retardant properties. Generally it has been necessary to vary intumescent formulation components in ways that increase price, oftentimes decrease intumescent behavior and/or decrease the flexibility of the intumescent paint.

Although fire-retardant tapes have been used as substitutes for prior art intumescent paints, these tapes nevertheless require the bonding of a separate intumescent coating to a backing material. As in the case of paints, involved procedures are required in order to obtain a desired uniform thickness of coating; additionally, this intumescent coating remains unprotected from the effect of solvents, particularly water if a water soluble intumescent composition is used, and wear.

On the other hand, fire-retardant sandwich panels for use as a construction material have been prepared by treating a paper with foam-forming fireproofing agent and bonding this paper to two outer layers of plastic, wood or metal. However, these outer layers are rigid and thus prevent the formation of a sufficiently thick intumescent char having the necessary heat-insulative and fire-retardant properties.

As a result of this invention, fire-retardant intumescent laminate materials have been developed which to not possess the undesirable features of the aforementioned prior art material.

An object of this invention is to provide inexpensive and effective intumescent laminate systems which possess excellent resistance to high humidity and washing conditions.

A further object is to provide flexible fire-retardant intumescent laminate systems having various thicknesses which can be easily adhered to the surface of a combustible or heat-sensitive or heat-deformable material.

Still another object is to provide and intumescent laminate system composed of multiple layers which is suitable for protection of thermally delicate organic polymeric foams.

Accordingly, the aforementioned and other objects are achieved by utilizing the fire-retardant, intumescent laminate system of this invention which comprises an intumescent layer comprising a porous sheet material which is impregnated with an intumescent composition and a flexible protective layer adhered to the outer surface of the intumescent layer. The intumescent laminates can be adhered to the surface to be protected by means of an adhesive.

The intumescent laminate systems of this invention may also include additional layers such as a vapor transmission barrier layer, e.g., aluminum foil and/or a thermal barrier layer, e.g., glass wool or cardboard adjacent to the intumescent layer. These multiple layer containing intumescent laminate systems are particularly suitable for application to the surface of highly heat-sensitive substrates such as organic foams which have relatively poor thermal stability.

The present invention is best understood by reference to the following description taken with the drawings, in which:

FIGS. 1–6 illustrate several embodiments of the intumescent laminate systems of the invention.

Referring to FIG. 1 of the drawing, there is shown the intumescent laminate system 10 comprised of an intumescent layer 11 which is a porous sheet material such as paper impregnated with an intumescent composition. Adhered to the intumescent layer 11 is a flexible protective layer 12 which is capable of yielding or deforming with or without rupture under conditions of fire or heat so that the intumescent composition can freely expand and swell to the desired necessary thickness.

Figure 4:
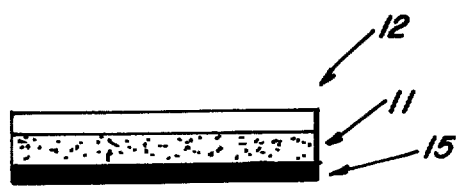
FIG. 4 shows another embodiment in which the intumescent laminate system of FIG. 1 includes an additional vapor barrier layer 15, e.g., aluminum foil, polyester film, e.g., Dacron, or teflon, adhered to the inner surface of the intumescent layer 11.
Figure 5:
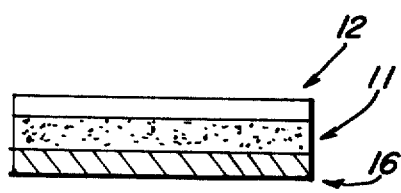
FIG. 5 shows still another embodiment in which the intumescent laminate system of FIG. 1 includes an additional thermal barrier layer 16, e.g., asbestos, glass wool or cardboard, adhered to the inner surface of the intumescent layer 11.

The intumescent laminate systems illustrated in FIGS. 4 and 5 can be adhered directly to the surface of the heat-sensitive substrate.

The choice of using either of the intumescent laminate systems shown in FIG. 4 or FIG. 5 depends on the thermal stability characteristics of a particular substrate material to be protected. Certain heat-sensitive materials are capable of surviving the temperatures reached during an intumescent reaction by being covered with an intumescent laminate system having only a vapor barrier 15, while others require one having a thermal barrier layer 16.

Figure 1:
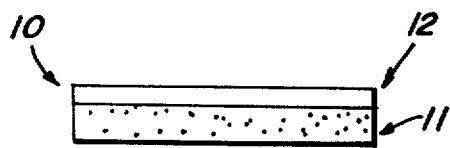
Figure 2:
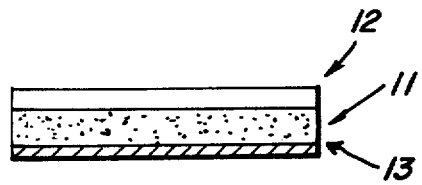
FIG. 2 shows another embodiment of the intumescent laminate system wherein an adhesive layer 13, e.g., pressure-sensitive adhesive, is bonded to the inner surface of the intumescent layer 11. Such a laminate may be applied directly to the surface to be protected.
Figure 3:
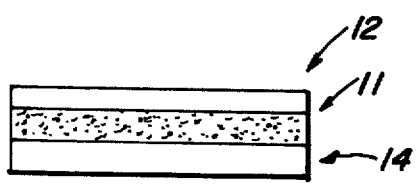
FIG. 3 illustrates the intumescent laminate system of this invention adhered to the surface of a combustible or heat-sensitive substrate 14.
Figure 6:
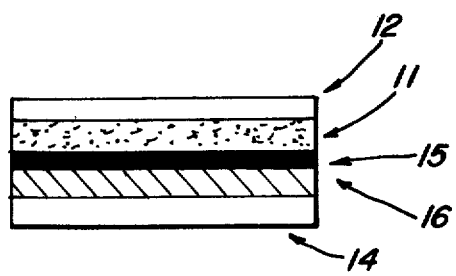

However, the preferred embodiment is illustrated in FIG. 6 in which the intumescent laminate system of FIG. 1, adhered to a heat-sensitive substrate 14, includes both a vapor barrier layer 15 and a thermal barrier layer 16 adhered to the intumescent layer 11. Although the sequence of the vapor barrier layer 15 and thermal barrier layers may vary, it is preferred, as shown in FIG. 6, that the vapor barrier layer 15 be adjacent to the intumescent layer 11. The intumescent laminate system of FIG. 6 is particularly an effective fire-retardant protective overlay for thermally delicate organic foams such as certain polystyrenes and polyurethanes.

It is to be noted that when either a thermal barrier layer 16 or both the vapor barrier layer 15 and the thermal barrier layer 16 is included in an intumescent laminate system, the particular intumescent layer 11, i.e., porous sheet material impregnated with the intumescent composition, can be replaced by other intumescent layers. Such other intumescent layers include intumescent coatings, e.g., well-known intumescent paints, mastic coatings or fire-retardant intumescent tapes having an intumescent coating directly bonded to a backing material as disclosed in U.S. Pat. No. 3,336,153. When prior art intumescent coating, e.g., the intumescent paints or mastics, are utilized as the intumescent layer, a flexible protective cover layer 12 is not always employed. Although the latter prior art intumescent layers per se, upon intumescing, are not as effective thermal insulators as in the intumescent laminate system of this invention as illustrated in FIG. 1, they may be effectively used in combination with the thermal barrier layers or the combined vapor barrier and thermal barrier layers of this invention, since these barrier layers provide sufficient insulation to the heat-sensitive substrate.

The intumescent layer comprises a porous sheet material which is impregnated with an intumescent composition. The impregnated sheet material is any sufficiently porous adsorbent material which will absorb the intumescent composition. Porous materials which can be substantially impregnated, i.e., saturated with the desired intumescent composition, may be composed of natural or synthetic organic and inorganic materials and mixtures thereof. Thus the porous sheets may be cellulosic or protein materials, synthetic organic polymeric foams and porous films or inorganic porous materials.

It is, however, required that the porous sheet material be thermally stable, at least up to the intumescent temperature range and throughout the intumescent reaction. Typical preferred intumescent compositions begin to intumesce at about 120°C to about 200°C. Therefore, whenever intumescent compositions having higher incipient intumescent temperature ranges are utilized, appropriate higher temperature stable porous sheet materials may be utilized.

Although porosity and thermal stability are the only required characteristics of the material, preferably the porous sheet material is also flexible. The porous sheet material may be in a woven, non-woven or mixed structure.

The thickness of each individual porous sheet to be impregnated with the intumescent compositions depends on the absorbency capacity of the porous material. Typical suitable thicknesses range from about 5 mils to 1.0 inch, preferably from about 10 mils to 0.5 inch. Thinner or thicker porosity sheets may be employed if desired. One group of porous sheet materials employed in this invention are those prepared from natural, synthetic organic polymeric fibers, inorganic fibers and mixtures thereof. Operable porous materials can be prepared from natural fibers such as cellulose, protein, e.g., silk, wool; inorganic fibers such as asbestos or metallic fibers; synthetic inorganic polymeric fibers such as polyimide, polyester, acrylonitrile/vinyl chloride copolymeric fibers and the like.

The preferred porous sheet material in the above group is that derived from cellulosic fibers which may be combined with fibers of synthetic origin. Examples of well-known sources for cellulose fibers include cotton, flax, wood, bagasse, regenerated cellulose such as rayon and the like. Typical well-known cellulosic porous sheet-like materials include paper and fabrics such as α-cellulose paper, kraft paper, cardboard, cotton or linen cloth, burlap, etc.

Non-limiting examples of other porous sheet-like substrates include vermiculite or asbestos paper, glass cloth or asbestos-glass fiber paper, e.g., as disclosed in U.S. Pat. No. 3,212,960, porous nylon fabrics or films, microporous polyethylene films and the like.

Another group of porous materials suitable for impregnation are rigid or flexible organic polymeric foams such as polyurethane, polyester, polyamide, epoxy resin, phenol or urea formaldehyde resin, polyethylene, cellular rubber or latex foam rubber, silicone and the like. The aforementioned polymeric foams, i.e., cellular polymers, and preparation thereof are well known in the art and generally are commercially available products. Preferably these foams are flexible and possess an open celled structure.

Specifically, preferred types of polymeric foams which are very suitable as porous materials in this invention are polyurethane foams as set out in copending application Ser. No. 250,013 filed on May 3, 1972 and incorporated herein by reference. These cellular polymers are hydrophilic crosslinked polyurethane foams prepared by reacting an isocyanate capped polyoxyethylene polyol reactant with large amounts of an aqueous reactant. The cell walls of these crosslinked hydrophilic product foams are characterized with at least 50 percent by weight (dry weight basis) of an isocyanate capped polyoxyethylene polyol, exclusive of fillers or other additives.

These foams possess a high degree of absorbancy and therefore a given thickness of this foam material is capable of being impregnated with relatively high contents of intumescent compositions.

Porous components as used herein include (a) materials which possess inherent large degrees of porosity in the structure (e.g., cellulose fibers) and therefore can form a porous substrate having the desired absorbancy; and (b) materials which initially possess little or no inherent porosity in the structure, yet, after appropriate treatment such as sintering, leaching, blowing, etc., form a porous substrate having the desired absorbancy. An example of latter type of porous component is a microporous polyethylene film formed by solvent extraction with an appropriate solvent, a non-reactive leachable additive incorporated into a polyethylene film.

Although the above porous sheet materials are comprised mainly of the aforedescribed porous materials, this porous sheet material can optionally contain non-porous components such as fillers, dyes, pigments, plasticizers, etc.

The porous sheet material should not be coated or impregnated with materials which will prevent substantial penetration of the intumescent composition into the porous material during the impregnation step. For instance, pretreatment of the porous material with synthetic latex wet strength impregnants is undesirable.

The operable intumescent compositions are those which will penetrate uniformly across the entire thickness of the porous sheet material and not merely coat the surface of the porous sheet material. Numerous organic solvents, e.g., hydrocarbon or halogenated hydrocarbon, or soluble component containing intumescent compositions are known and operable, however, these materials are more costly. Most solvents require long drying times and generally are hazardous. Therefore, preferably the intumescent composition should be composed of components which are water soluble or water dispersible at the time of impregnation into the porous substrate. It is to be noted that water dispersible intumescent compositions must be composed of extremely finely dispersed particles in order that the colloidal intumescent dispersions are uniformly absorbed throughout the porous substrates. Generally most dispersions are composed of larger particles which result only in a surface coating and not a uniform impregnation of the porous sheet material.

Therefore, the most suitable intumescent formulations are low cost, water soluble compositions which are well-known and generally commercially available materials. Typically these intumescent compositions include resinous carbonifics such as the heat curable amino-aldehyde condensation products. The resinous carbonific can be a preformed water-soluble resin, e.g., a urea-formaldehyde resin, or it can be present in a resin forming mixture containing an amino source such as urea, thiourea, melamine and the like; along an aliphatic aldehyde (or a source of aldehyde) such as formaldehyde, paraformaldehyde, trioxane or he amethylenetetramine, acetaldehyde and the like. If the preformed resin is not water soluble, but is water dispersible, the resin should be in a finely divided particulate form sufficient to penetrate the porous substrate during impregnation. The resinous carbonific is usually present in an amount between 10 and 60 percent by weight.

The intumescent composition also includes a spumific material which assists in the production of a thick, heat insulating carbonaceous foam. Suitable known spumific compounds include mono- or di-ammonium phosphate, phosphoric acid, melamine pyrophosphate, ammonium sulfate, ammonium bromide, sodium tungstate and the like. This spumific is generally present in an amount between 20 and 50 percent by weight.

Preferably the intumescent composition includes a non-resinous carbonific which is carbonaceous and enhances the effect of the spumific by imparting solids and puffing. Suitable non-resinous carbonifics include carbohydrates such as starch, dextrin, sucrose and lactose; and polyhydroxy compounds such as glycerine, sorbitol, mannitol, pentaerythritol, dipentaerythritol and the like. The non-resinous carbonifics are usually present in an amount between 20 and 50 percent by weight.

Furthermore, more efficient intumescent properties can be attained by the addition of blowing agents that decompose at the appropriate temperature. These agents can, in addition to forming non-flammable gases for foaming, interact with the resin and/or inorganic polyester to form complex char structures. Such blowing agents include but are not limited to boric acid, dicyandiamide, cyanoacetamide, ammonium oxalate, ammonium carbonate, ammonium acetate, halogenated hydrocarbons and the like. These agents may be present in an amount between 5 and 20 percent by weight.

If desired, stabilizers, fungicides, bactericides and other additives may be included in the intumescent formulations in amounts ranging between 0.1 and 5 percent by weight.

Preferably the intumescent composition when used as a saturant for porous substrates should be free from water insoluble latex-like film forming polymers such as high molecular weight polyvinyl acetate, styrene-butadiene copolymers, chlorinated polymers such as chlorinated rubber, polychloroprene, polymers and copolymers of vinyl chloride or of vinylidene chloride, e.g., polyvinyl chloride and the like. The presence of the latter type polymers is not necessary nor preferred because the subject intumescent compositions are not applied as mere surface coatings as are the prior art intumescent paints which require these components for enhancing the durability, wet scrub resistant and adhesive properties of the intumescent composition. Generally the presence of the synthetic latex decreases the intumescent quality of the composition. Furthermore, if the polymeric latex is incorporated into intumescent composition utilized to impregnate the subject porous sheet materials, the polymeric particles must be in a fine sized dispersion which is capable of penetrating throughout the entire thickness of the porous sheet.

Intumescent layers having satisfactory intumescent properties have been obtained when porous sheet materials were impregnated with a water-soluble intumescent composition containing the following admixed components in which the parts are by weight:

|  | Parts |
|---|---|
| monoammonium phosphate | 80 |
| diammonium phosphate | 80 |
| urea | 180 |
| trioxane | 32 |
| glycerine | 120 |
| water | 400 |

In general the impregnation of the porous sheet material can be accomplished by any conventional impregnation means as by dipping or spraying and the like. Thereafter the impregnated porous sheet is allowed to dry to remove the volatile components. In case of some porous organic foams, e.g., polyurethane foams, disclosed in copending application U.S. Ser. No. 250,013 filed May 3, 1972, the intumescent composition can be incorporated into a foamable polyurethane reaction mixture and the resulting mixture is allowed to polymerize to an intumescent polyurethane. The impregnation process must be such that the intumescent composition penetrates throughout the entire thickness of the porous sheet material and does not merely coat the surface of the porous sheet material.

The percentage solids pick-up of the intumescent composition, based on the dry weight of the porous sheet material required for providing of adequate intumescent properties of the intumescent laminate is determined by absorbence capacity of the porous sheet material. Generally when more absorbent porous sheet materials are utilized a lower pick-up is needed. For instance when using the aforedescribed hydrophilic polyurethane foams as set out in the copending application Ser. No. 250,013 filed May 3, 1972, a solids pick-up of the intumescent composition of only about 50 percent by weight of the porous polyurethane foam (dry basis) is required in order to achieve good intumescent characteristics. These foams can, however, have a solids pick-up of greater than 100 percent by weight on the same basis. The preferred porous sheet materials are the most absorbent materials since they are capable of being impregnated with greater amounts of the intumescent composition. Excellent intumescent properties have been attained in which the solids pick-up of the intumescent composition ranges from about 150 to 800 percent by weight of the porous sheet material (dry basis).

A typical impregnation procedure consists of dipping a porous sheet material such as paper into an intumescent solution such as is described above, and thereafter drying at a temperature up to about the temperature the intumescent reaction is initiated. Temperatures of about 90° to 100°C are effective to remove the water and to cure any resin forming components of the intumescent composition. If desired, drying may be accomplished under reduced pressure conditions.

It has been found that intumescent composition pick-up is substantially increased when a dried impregnated porous sheet is further subjected to one or more subsequent dipping and drying steps, thereby resulting in a porous impregnated sheet having superior intumescent properties.

If desired more than one impregnated porous sheet material may make up the intumescent layer of this invention. For instance, two or more porous sheet materials having a desired thickness may be separately impregnated with a suitable intumescent composition, dried and thereafter assembled to form a composite intumescent layer. The separate impregnated porous may be bonded to each other by any suitable means, such as adhesive or heat lamination; or they may be overlaid prior to drying and thereby bonded concurrently with drying.

A protective cover layer is applied to the outer surface of the intumescent layer. This outer protective layer must be composed of a flexible material. The term "flexible material" as used herein is a material capable of yielding or deforming, with or without rupture, under conditions of fire or heat so as to allow the intumescent composition within the porous sheet to freely expand and swell to the desired necessary thickness thereby forming the protective foamed char barrier. Preferably this protective layer is flexible, prior to exposure to fire or heat. However, materials initially possessing some rigidity, but which are flexible as defined above under fire and heat may be employed. This cover layer primarily functions to protect the intumescent layer. For this reason it must be solvent resistant and particularly water resistant in cases where a water soluble intumescent composition is impregnated throughout the porous sheet material. This outer layer can be composed of materials which function also as gas barriers, e.g., aluminum foil, and/or are resistant to abrasion or wear. Preferably the material should also be flame retardant, i.e., possess low flame spreadability. Materials suitable for use as protective cover layers include various flexible organic and inorganic materials and mixtures thereof. Operable flexible organic layers may be based on thermoplastic resins which include but are not limited to vinyl or vinylidene halide resins, hydrocarbon resins, alkyl resins, polyester resins, epoxy resins and mixtures therof. Thermoplastic resin based coatings are particularly suitable since these materials melt upon application of heat.

Typical preferred flexible organic coatings or films include polyvinyl chloride, polyvinyl fluoride, polyvinylidene chloride, polyvinylidene fluoride, polyethylene terephthalate, polyethylene and polyamide and the like.

Other materials which can be used as the flexible protective cover layer include but are not limited to metal foils and metallized plastics such as metallized polyethylene terephthalate and various synthetic or natural fiber containing textiles, including woven or nonwoven fabrics such as nylon, glass cloth, etc. Particularly suitable members of the latter group are various well known waterproofed and flameproofed textile materials.

The flexible protective cover layer can be applied to the outer surface of the intumescent layer as a preformed film or layer, e.g., polyvinyl chloride film or a nylon web; or waterproofed fabric layer. The coating composition such as various organic polymeric coating compositions can be applied as a latex or non-aqueous dispersion or can be dissolved in an appropriate organic solvent or water. Conventional coating methods such as brushing, spraying, roll coating, knifing, etc., can be used to apply the dissolved or dispersed coating compositions bo the surface of the intumescent layer.

The flexible protective cover layer may comprise more than one layer of material which may be the same or different. It is particularly preferred that at least one layer be hydrophilic. For instance, a laminate structure such as a flexible polyester resin-glass cloth laminate adhesively or heat bonded to each other, may be adhered directly to the intumescent layer surface. If a polymer layer is applied in a latex form to an intumescent layer containing water-soluble, i.e., water leachable, components, it is preferred to initially apply a base coating, e.g., a hydrophobic film forming polymer dissolved in a non-flammable organic solvent prior to the application of the latex coating. If desired a clear top coating may finally be applied to the previously formed layers.

The thickness of the flexible protective cover layer depends on the desired mechanical properties. Suitably, this cover layer, whether it is comprised of a single or multiple layers, usually ranges from about 0.5 to about 10 mils in thickness, preferably 1 to 4 mils.

When the flexible protective cover is employed in a preformed film form it can be applied to the surface of the intumescent layer in any conventional manner, such as bonding with a suitable adhesive or heat bonding. Where the protective cover layers are composed of coating materials which require curing or heat fusion, the temperatures required for these reactions must be below the intumescent point of the intumescent composition. The bonding may also be part of the porous sheet drying step when heat methods are being used.

The intumescent laminates comprising the intumescent layer, i.e., the porous sheet material impregnated with the intumescent composition, and having the flexible protective cover layer adhered to one surface of the intumescent layer can be applied to the surface of the substrate to be protected, e.g., a wall, plywood, thermally sensitive foams, etc. The methods of adherence to the substrate can be either by coating the inner surface of the intumescent laminate with an adhesive or coating the surface of the substrate to be protected with the adhesive prior to bonding. If desired both surfaces can be coated with the bonding adhesive.

The adhesive must be thermally stable, at least up to initial intumescent temperature range as previously described, and preferably throughout the intumescent reaction. If thermosetting type adhesives are utilized these should be heat curable below the intumescent point of the intumescent composition. Thus any known adhesive possessing the above described characteristics may be utilized. Typical non-limiting examples of operable adhesives include synthetic resin based phenolics such as phenol-formaldehyde or resorcinol-formaldehyde, urea or melamine-formaldehyde type, epoxy resins, polyesters, polyurethanes, acrylics, silicones, synthetic rubber based resins, vinyl alkyl-ethers. Particularly suitable are polyvinyl alcohol or polyvinyl acetate latex based adhesives.

The adhesives may be thermoplastic or thermosetting, although the latter is preferred. Additionally, if desired, the adhesive may be pressure-sensitive. Silicone based pressure-sensitive adhesives are particularly suitable. If desired, the pressure-sensitive adhesive layer may be applied to the inner surface of the intumescent layer and a strippable protective layer, e.g., a release coated paper, may be attached to the adhesive surface prior to use of the intumescent layer.

The adhesive layer need not be continuous, and the thickness of the adhesive layer is not critical. Conventional coating methods, e.g., roll-coating, brushing, spraying, knifing and the like can be employed to apply the adhesive.

It has also been found that an improved fire retardant intumescent laminate system suitable for application to a heat sensitive substrate can be obtained by including an intermediate vapor and/or thermal barrier layer between the intumescent layer and the heat sensitive substrate. In cases where the intumescent laminate system of this invention is used as a fire-retardant protective overlay on thermally sensitive substrates, e.g., organic polymeric foams having relatively poor thermal stability, e.g., certain polystyrene, polyethylene, polyurethane etc. foams, the presence of at least one of these additional layers prevents premature degradation or melting of the organic foam. It has been observed that during the intumescent reaction the area beneath an intumescent layer rapidly reaches temperatures from about 130° to 200°C. This early temperature rise causes melting or significant thermal damage to thermally delicate organic foams. If an appropriate barrier layer, e.g., a vapor and/or thermal barrier layer is included between the intumescent layer and the thermally delicate foam, the heat and hot gases formed in the intumescent reaction can be isolated from the thermally sensitive foam and sufficient time can be provided for the formation of the heat insulative intumescent char.

Materials suitable for use as thermal barrier layers can be any heat insulative material that is thermally stable at least up to about 200°C. The thermal barrier layers can be composed of organic or inorganic materials and mixtures thereof. Preferably these materials are porous. Operable heat insulative materials suitable for use as a thermal barrier layer include, but are not limited to, mineral or glass wool, inorganic cements, expanded vermiculite or perlite compositions, wood, paper materials such as cardboard; woven or non-woven fibrous materials, e.g., cellulosic webs, asbestos paper and other high temperature resistant materials.

Generally the thermal barrier layer is in the range of from about one-eighth to 3.0 inches in thickness, and preferably from about one-fourth to 1.0 inch. Thicker or thinner thermal barrier layers can be employed if desired. The thermal barrier layer may comprise more than one layer of material which may be the same or different. For instance two bonded layers of paper cardboard, each being about one-eighth inch thick, would be suitable for use as the thermal barrier layer.

The vapor barrier layer must be impermeable to the hot gases formed during the formation of the intumescent char. The vapor barrier layer functions to isolate these hot gases from the thermally delicate substrate. Usually the gases formed during intumescent reactions include steam, ammonia, formaldehyde, carbon dioxide, carbon monoxide and the like. Materials suitable for use as the vapor barrier layer can be any vapor impermeable material that is thermally stable at least up to about 200°C.

Many organic and inorganic materials can suitably be used as vapor barriers for the fire retardant intumescent laminate systems of this invention. Non-limiting examples include various metallic foils such as steel, copper and aluminum foils, synthetic plastic films such as polyethylene terephthalate, polychloroethylene, polyfluoroethylene, polychlorofluoroethylene, polyester resin layers or films and the like.

The thickness of the vapor barrier layer depends on the short term permeability to the gases evolved during intumescence. Vapor barrier layers having thickness from about 1.0 to 5.0 mils, and preferably from 1.0 to 3 mils, are generally satisfactory, although if desired thinner or thicker vapor barrier layers may be employed. The vapor barrier layers may comprise more than one layer of material which may be the same or different.

Generally improved protection of a thermally sensitive substrate is obtained by covering the substrate with the intumescent laminate system of this invention, i.e., the intumescent layer comprising the porous sheet material impregnated with an intumescent composition and having a flexible protective overlay adhered to the outer surface of the intumescent layer and a thermal barrier layer adhered to the inner surface of the intumescent layer. However, adequate protection can be obtained by using the intumescent laminate system which includes the vapor barrier layer as the only immediate barrier layer between the intumescent layer and the heat sensitive substrate. Many of the latter substrates possess greater thermal stability and thus are capable of surviving the effect of a high temperature source, e.g., fire, with only the intermediate vapor barrier layer, since the instant intumescent laminate satisfactorily furnishes a major portion of the necessary insulative and fire retardant protection.

However, a relatively thermally delicate substrate may be more effectively protected by including both a thermal barrier layer and a vapor barrier layer in the fire retardant, intumescent laminate system of this invention. When using both barrier layers, it is preferred that the vapor barrier be adjacent to the intumescent layer. However, if desired, the thermal barrier layer may be proximate to the intumescent layer.

The thermal and/or vapor barrier layers can be bonded to the intumescent layer and the surface of thermally sensitive substrate in any conventional manner such as gluing with an adhesive or heat bonding. In some cases these thermal or vapor barrier layers are composed of materials possessing adhesive properties, thus bonding to the desired surface can be accomplished by mere pressure and with or without heat. Suitable adhesives for bonding these intermediate barrier layers are the above described adhesive utilized in adhering the flexible protective cover layer to the porous sheet material impregnated with the intumescent composition. Thus the adhesive should be thermally stable at least up to the initial intumescent temperature range, e.g., up to 120°C and preferably throughout the intumescent reaction. Similarly, if heat curable adhesive or heat bonding steps are employed, the process should be operable at tempertures below the intumescent point of the composition. In many cases when the substrate to be protected is extremely thermally sensitive it is not always desirable to use heat or heat curable adhesive to achieve bonding with the various intumescent laminate systems of this invention.

It is not necessary that the adhesive layer be continuous nor is the thickness of this layer critical. The adhesive can be applied to any of the desired surfaces by any of the aforementioned known coating methods.

It has been found that premature degradation, deformation or melting of highly thermally sensitive substrates and particularly relatively thermally delicate organic foams can also be delayed or prevented if the aforedescribed thermal barrier layer, alone or in combination with the vapor barrier layer, is employed as an intermediate barrier layer in an intumescent laminate system in which various prior art intumescent layers are utilized in place of the instant intumescent layer having the flexible protective cover layer. Many other intumescent layers are known and are generally commercially available materials such as various intumescent paints, intumescent mastic coatings and the like. The use of a flexible protective layer for these prior art intumescent layers is optional and in some cases it is not even desirable.

The fire retardant intumescent laminate systems of this invention have many advantages over prior art materials as well as numerous uses. The intumescent layer, i.e., porous impregnated sheet material having the protective cover layer is highly suitable as a flexible fire retardant wall covering. Sound absorbing and resilient wall coverings can be obtained, if a polymeric foam is used as the porous sheet component of the fire retardant intumescent laminate. The vapor barrier and/or thermal barrier layer containing intumescent laminate adhered to a polystyrene foam substrate is a fire retardant intumescent article useful as a cold room insulation. Similarly, the intumescent, especially the multi-layered laminate systems, are suitable for fabrication of light weight fire doors, panels, screens and the like.

It is understood that the foregoing detailed description is given merely by way of illustration and that many variations and modifications may be made therein without departing from the spirit of the invention.

The following examples are meant to illustrate, but not to limit the invention. All parts and percentages are by weight, unless otherwise specified.

EXAMPLE 1

A water soluble intumescent composition was prepared by mixing the following ingredients together until a clear solution resulted: 20 g of monammonium phosphate, 20 g of diammonium phosphate, 30 g of glycerine, 40 g of urea, 8 g of trioxane, 2.5 g of boric acid, 2.5 g of cyanoguamidene and 100 g of water. This solution will hereinafter be referred to as intumescent composition A.

EXAMPLE 2

A brown porous paper approximately 25 mils thick and weighing 82 lb/ream was impregnated by being dipped in solution of the intumescent composition A formed in Example 1. Thereafter the porous paper impregnated with the instumescent composition was allowed to dry and the resin forming components were cured at a temperature of about 100°C for about one-half hour thereby forming a composite hereinafter to be referred to as an intumescent layer. The weight gain after curing was about 200 percent of the original dry paper weight. An intumescent laminate was formed by covering the dried impregnated paper, i.e., the intumescent layer, with a 2.0 mil thick preformed flexible film of polyvinyl chloride that has been printed to resemble wood grain. This polyvinyl chloride film was adhered to the outer surface of the intumescent layer by an adhesive containing a polyvinyl-acetate emulsion. The inner surface of the intumescent laminate, i.e., the polyvinyl acetate emulsion containing adhesive, was bonded to the surface of ¼ inch thick plywood.

The outer surface of the laminate was exposed to an 1800°C propane torch flame. The polyvinyl chloride film melted immediately and an intumescent char rose during the first minute to a height of about 1.0 inch. Prior to exposure to the flame, a thermocouple for recording of temperatures at the surface of the plywood was placed in a hole formed in the plywood with its junction directly opposite the flame, i.e., on the inner, cool side of the intumescent layer. The ignition temperature of wood of 450°C was not reached for a period of about 6 minutes.

EXAMPLE 3

This example illustrates the fire retardant properties of prior art materials. A ⅛ inch asbestos pad was adhered to the surface of a ¼ inch thick plywood. The laminate was exposed to identical propane torch flame conditions as described in Example 2. The ignition temperature of wood was reached in about 30 seconds.

EXAMPLE 4

Table A illustrates porous paper impregnated with various amounts of the intumescent composition and curing conditions. The paper used for impregnation, intumescent composition and the exposure to flame conditions were identical to those in Example 2. In cases where more than one dipping step was employed to impregnate the porous paper, the impregnated paper was cured and dried each time prior to subsequent redipping.

Table A

| Test No. | Intumescent composition Wt. pick-up after final cure (based on dry paper weight) | Type of Impregnation | Time to reach 450°C at Plywood Surface (minutes) |
|---|---|---|---|
| I | 180% | single dip, cure at 25°C for 24 hrs. | 2.5 |
| II | 180% | single dip, cure at 50°C for 1 hour | 4.5 |
| III | 350% | double dip, each cure ½ hr. at 100°C | 14.0 |
| IV | 600% | triple dip, each cure ½ hr. at 100°C | 16.00 |

EXAMPLE 5

Example 1 was repeated except that 30 g of mannitol was substituted for the glycerine component. The thus formed solution will hereinafter be referred to as intumescent composition B.

EXAMPLE 6

A brown porous paper approximately 25 mils thick and weighing 80 lb/ream was impregnated by being dipped in solution of the intumescent composition B formed in Example 5. Thereafter the porous paper impregnated with the intumescent composition was allowed to dry and cure the resin forming components at a temperature of about 100°C for about 1 hour, thereby forming an intumescent layer. The weight gain after curing was about 450 percent of the original dry paper weight. The thickness of the dried impregnated paper was about 35 mils.

EXAMPLE 7

A 2 inch thick glass wool was soaked in a solution of intumescent composition A formed in Example 1. Thereafter, the glass wool layer impregnated with the intumescent composition was allowed to dry and cure at about 100°C for about 3 hours, thereby forming an intumescent layer. The weight gain after curing was about 800 percent of the original dry glass wool weight.

The thus formed glass wool intumescent layer was bonded to the surface of a ¼ inch thick plywood with a polyvinyl acetate adhesive. The outer surface of the laminate was exposed to about a 1500°C Bunsen burner flame. Upon exposure to the flame an excellent intumescent char formed. The temperature at the surface of the plywood was measured by means of a thermocouple located in a hole formed in the plywood with its junction directly opposite the flame, i.e., on the cool, inner surface of the glass wool intumescent layer. The temperature at the surface of the plywood proximate the intumescent layer did not rise to 400°C in 8 hours.

EXAMPLE 8

A laminate was formed as follows, a layer of a thermally delicate polystyrene foam having a thickness of about 1.0 inch was coated with a polyvinyl acetate adhesive. A thermal barrier layer comprising four bonded layers of 200 lb test kraft paper cardboard, each layer having a thickness of about one-eighth inch and bonded to each other by means of a polyvinyl acetate adhesive was adhered to the adhesive coated surface of polystyrene foam. The outer surface of the cardboard thermal barrier layer was coated with a polyvinyl acetate adhesive and a 3 mil thick aluminum foil used as the vapor barrier layer was bonded to the coated cardboard surface. Thereafter the intumescent layer formed in Example 4 was adhered to the surface of the aluminum vapor barrier layer and a 2.0 mil thick flexible waterproof polyvinyl chloride film was adhered to the outer surface of the intumescent layer. The adhesive used to bond the aluminum layer and the polyvinyl chloride film to the above mentioned surfaces was polyvinyl acetate.

The thus formed laminate was placed at a 45° angle from a Meeker burner at a distance that assured the maximum flame temperature at the tip of the light blue inner cone (about 1600°C) was within 0.5 inches of the surface of the laminate. Upon exposure to the flame, an intumescent reaction was observed during which the polyvinyl chloride film layer melted and an excellent intumescent char was formed. The laminate was held in this position for a period of 25 minutes and at the completion of the test there was no evidence of melting of the polystyrene foam.

EXAMPLE 9

Example 8 was repeated except that the laminate was exposed to an impinging flame of a Bunsen burner having a maximum flame temperature of about 1500°C. Very good intumescence was observed and after 30 minutes of exposure to the flame no damage to the polystyrene foam could be observed.

EXAMPLE 10

A laminate was formed by adhering a thermal barrier layer comprising four bonded layers of 200 lb. test kraft paper cardboard to a polyvinyl acetate adhesive coated surface of a 1 inch thick thermally sensitive polystyrene foam. Initially the individual cardboard layers, each layer having a thickness of about one-eighth inch, was bonded to each other with the polyvinyl acetate adhesive. A fire retardant, intumescent, intumescent laminate comprising the intumescent of Example 6 and having adhered to its outer surface a 0.002 inch thick flexible polyvinyl chloride film was bonded with a polyvinyl acetate adhesive to the outer surface of the cardboard thermal barrier type. A flame from a propane torch having a temperature of about 1800°C was exposed to the polyvinyl chloride film surface of the laminate causing an intumescent reaction during which a very good intumescent char was formed. It was observed that a small amount of the polystyrene foam melted in about 4 minutes.

EXAMPLE 11

Example 8 was repeated except that the cardboard thermal barrier layer was replaced by about 2.0 inch thick dry glass wool and the laminate was exposed to the yellow flame of a Bunsen burner instead of to that of the Meeker burner. Very good intumescent properties were observed and after exposure to the flame for about 20 minutes there was no evidence of melting of the polystyrene foam.

EXAMPLE 12

A 2.0 inch thick glass wool layer was impregnated with the solution of the intumescent composition B formed in Example 5. After drying and curing at 100°C for a period of 4 hours an intumescent layer was formed having a weight gain of about 800 percent of the original dry weight of the glass wool.

The surface of a 4 inch thick polystyrene foam was coated with a polyvinyl acetate adhesive and a 2 inch thick dry glass wool layer, the thermal barrier layer was attached to the adhesive coated surface of the polystyrene foam. The outer surface of the thermal barrier layer was coated with the polyvinyl acetate adhesive and a 3.0 mil aluminum foil used as a vapor barrier layer was adhered to the adhesive coated glass wool thermal barrier layer. The intumescent layer, i.e., the above impregnated glass wool, was attached to the surface of the aluminum vapor barrier layer by means of a polyvinyl acetate adhesive.

The polystyrene foam covered with the above described multilayered intumescent laminate system was exposed to the 1800°C flame from a propane torch. Upon exposure to heat the intumescent layer swelled, thereby forming an excellent intumexcent insulative char. After exposure to the flame for about 15 minutes essentially no melting of the polystyrene foam was observed.

EXAMPLE 13

Example 8 was repeated except that the polyvinyl chloride film covered intumescent layer was replaced by a fire retardant intumescent mastic coating sold under the tradename Albi-Clad 89S and commercially available from Albi Manufacturing Corporation. This intumescent coating was vinyl rich heavy-bodied mastic coating was spread on the aluminum surface of the multilayered laminate and allowed to dry at 30°C for a period of one week, thereby forming an intumescent layer having a thickness of about three-sixteenths inch.

The intumescent laminate was subjected to the 1800°C flame from a propane torch instead of the Meeker burner. The melting of the polystyrene foam did not start until 18 minutes after application of the flame.

EXAMPLE 14

Example 13 was repeated except that the aluminum vapor barrier layer and the cardboard thermal barrier layer were omitted. When the polystyrene foam, protected only by the intumescent mastic coating, was subjected to propane torch flame the polystyrene foam melted in less than 2 minutes.

It is understood that the foregoing detailed description is given merely by way of illustration, and that variation may be made without departing from the spirit of this invention.

What is claimed is:

1. An intumescent, fire retardant laminate system for application to a substrate to be protected from fire and heat comprising
   a. an intumescent layer comprising at least one porous cellulosic sheet material selected from the group consisting of paper and fabric, impregnated with a water-soluble intumescent composition consisting essentially of
      1. a heat-curable amino-aliphatic aldehyde condensation product as a resinous carbonific,
      2. a non-resinous carbonific selected from the group consisting of carbohydrates and polyhydroxy alcohols, and
      3. a spumific selected from the group consisting of monoammonium phosphate, di-ammonium phosphate, phosphoric acid, ammonium sulfate, ammonium bromide, sodium tungstate and mixtures thereof; and
   b. a flexible, protective layer adhered to the outer surface of said intumescent layer, said protective layer being selected from the group consisting of organic thermoplastic resin layers and metallic foils.

2. A fire retardant laminate comprising:
   a. an organic polymeric foam to be protected from fire and heat,
   b. at least one intermediate barrier layer selected from the group consisting of a thermal barrier layer and a vapor barrier layer adhered to said foam, said thermal barrier layer consisting essentially of at least one heat insulative material that is thermally stable at least up to 200°C selected from the group consisting of mineral wool, glass wool, inorganic cements, expanded vermiculite, expanded perlite, wood, cardboard, cellulosic webs, and asbestos paper; and said vapor barrier layer consisting essentially of at least one vapor impermeable material that is thermally stable at least up to 200°C selected from the group consisting of metallic foils; and synthetic plastic films; and
   c. an intumescent layer adhered to said intermediate barrier layer, said intumescent layer comprising at least one porous cellulosic sheet material selected from the group consisting of paper and fabric, impregnated with a water-soluble intumescent composition consisting essentially of
      1. a heat-curable amino-aliphatic aldehyde condensation product as a resinous carbonific,
      2. a non-resinous carbonific selected from the group consisting of carbohydrates and polyhydroxy alcohols, and
      3. a spumific selected from the group consisting of monoammonium phosphate, di-ammonium phosphate, phosphoric acid, ammonium sulfate, ammonium bromide, sodium tungstate and mixtures thereof; and
   d. a flexible, protective layer adhered to the outer surface of said intumescent layer, said protective layer being selected from the group consisting of organic thermoplastic resin layers and metallic foils.

3. A laminate system of claim 1 wherein the intumescent composition includes a blowing agent selected from the group consisting of boric acid, dicyandiamide, ammonium oxalate, ammonium carbonate, ammonium acetate and mixtures thereof.

4. A laminate system of claim 2 wherein the intumescent composition includes a blowing agent selected from the group consisting of boric acid, dicyandiamide, ammonium oxalate, ammonium carbonate, ammonium acetate and mixtures thereof.

5. A laminate of claim 1 wherein the organic thermoplastic resin layer is a polyvinyl chloride film.

6. A laminate of claim 2 wherein the organic thermoplastic resin layer is a polyvinyl chloride film.

7. A laminate comprising the fire retardant laminate system of claim 1 adhered to a plywood substrate to be protected from fire and heat.

8. A laminate system of claim 1 wherein at least one thermal barrier layer is adhered to the inner surface of said intumescent layer, said thermal barrier layer consisting essentially of a heat insulative material that is thermally stable at least up to 200°C selected from the group consisting of mineral wool, glass wool, inorganic cements, expanded vermiculite, expanded perlite, wood, cardboard, cellulosic webs and asbestos paper.

9. A laminate system of claim 1 wherein at least one vapor barrier layer is adhered to the inner surface of said intumescent layer, said vapor barrier layer consisting essentially of a vapor impermeable material that is thermally stable at least up to 200°C selected from the group consisting of metallic foils, and synthetic plastic films.

10. A laminate system of claim 8 wherein at least one vapor barrier layer is adhered between said intumescent layer and said thermal barrier layer, said vapor barrier layer consisting essentially of a vapor impermeable material that is thermally stable at least up to 200°C selected from the group consisting of metallic foils, and synthetic plastic films.

11. A laminate system of claim 1 wherein the intumescent composition comprises from 50 to 800 percent by weight dry basis of the porous sheet material.

12. A laminate system of claim 1 wherein said porous sheet material is paper.

13. A laminate of claim 2 wherein said intermediate layer is a thermal barrier layer.

14. A laminate of claim 13 wherein said vapor barrier layer is adhered between said intumescent layer and said thermal barrier layer.

15. A laminate of claim 2 wherein the intumescent composition comprises from 50 to 800 percent by weight dry basis of the porous sheet material.

16. A laminate of claim 2 wherein said organic foam is polystyrene.

17. A laminate of claim 2 wherein said porous sheet material is paper.

18. A laminate of claim 2 wherein said thermal barrier layer is cardboard.

19. A laminate of claim 2 wherein said vapor barrier layer is an aluminum foil.

20. A laminate system of claim 2 wherein the flexible protective layer is an organic thermoplastic resin layer.

21. A laminate system of claim 2 wherein the flexible protective layer is an organic thermoplastic resin layer.

* * * * *

UNITED STATES PATENT AND TRADEMARK OFFICE
CERTIFICATE OF CORRECTION

PATENT NO. : 3,934,066
DATED : January 20, 1976
INVENTOR(S) : Robert M. Murch

It is certified that error appears in the above-identified patent and that said Letters Patent are hereby corrected as shown below:

Column 18, line 19, correct "claim 2" to read:

--claim 1--.

Signed and Sealed this

Twentieth Day of July 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,934,066

DATED : January 20, 1976

INVENTOR(S) : Robert M. Murch

It is certified that error appears in the above-identified patent and that said Letters Patent are hereby corrected as shown below:

In the Specification:

In Column 4, line 48, please delete the number "250,013" and insert therefor the number --250,012--.

Signed and Sealed this

Third Day of May 1977

[SEAL]

Attest:

RUTH C. MASON
*Attesting Officer*

C. MARSHALL DANN
*Commissioner of Patents and Trademarks*